July 31, 1951     J. GOLASZEWSKI     2,562,663
RODENT TRAP
Filed July 21, 1947
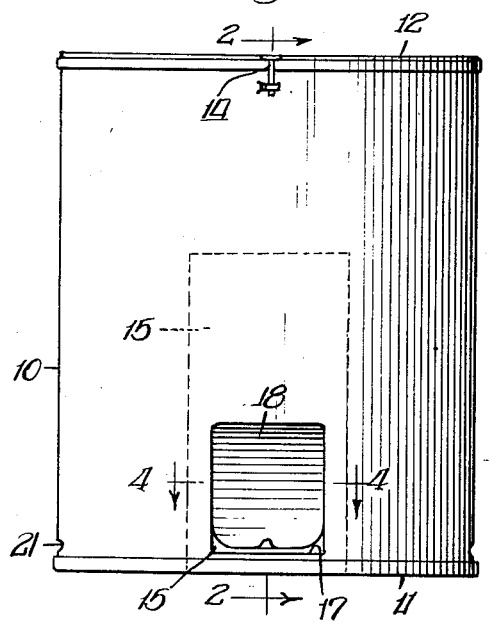
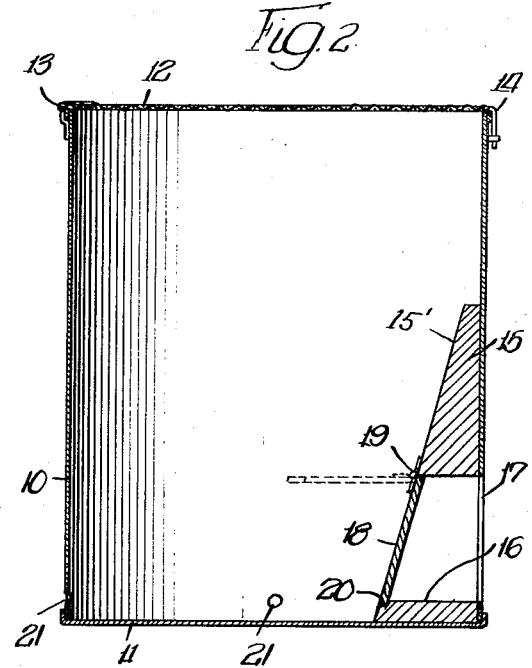
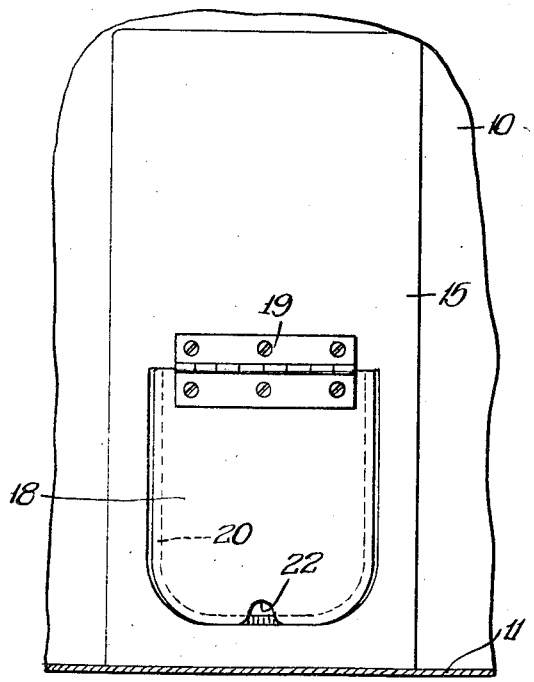
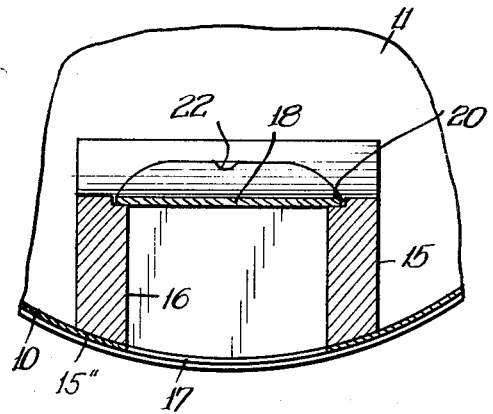
INVENTOR.
Joseph Golaszewski Patented July 31, 1951

2,562,663

UNITED STATES PATENT OFFICE 2,562,663

RODENT TRAP

Joseph Golaszewski, Chicago, Ill.

Application July 21, 1947, Serial No. 762,332

2 Claims. (Cl. 43—66)

The present invention relates to rodent traps and has for its main object the provision of a trap of very simple construction and of very effective operation.

A further object of the present invention is the provision of a trap consisting of a casing with a trap door cooperating therewith, the latter so positioned with relation to the casing as to permit an unobstructed entrance of a rodent into the casing but prevents an egress therefrom.

A still further object of the present invention is the provision of a trap of the type indicated wherein the trap door due to its gravity remains closed at all times, and is so positioned as to permit opening thereof at the push of an entering rodent and to prevent its opening from the side inward of the casing.

With the above general objects in view and others that will appear as the invention is better understood, the same consists in the novel construction, combination and arrangement of parts hereinafter more fully described, illustrated in the accompanying drawing and pointed out in the appended claims.

In the drawing forming a part of this application, and in which like designating characters refer to corresponding parts throughout the several views;

Fig. 1 is a side elevational view of the present trap;

Fig. 2 is a vertical cross-sectional view thereof, on line 2—2 of Fig. 1;

Fig. 3 is an enlarged, fragmentary, elevational view, looking from the inside of the trap; and Fig. 4 is a horizontal, enlarged, cross-sectional view on line 4—4 of Fig. 1.

Referring in detail to the present drawing there is shown therein a casing, including side wall 10, which may be of a cylindrical formation, as shown in the drawing. Said casing 10 rests upon bottom tray 11, to which said casing 10 may be secured.

The upper end of casing 10 is normally closed by closure 12, which is preferably made out of wire screen so as to permit a view therethrough inside into the casing. Said closure 12 is connected to casing 10 by hinge 13, and at the diametrically opposite point it has fastener 14 by means of which said closure may be secured to said casing 10.

Resting upon said tray 11 and in contact with casing 10 is frame 15, which may be secured to either said tray 11 or casing 10 or both and has an inner inclined face 15' and an outer curvilinear face 15'' conforming to the curvature of the casing wall. The face 15' of said frame 15, disposed oppositely to the longitudinal axis of casing 10, remains at an incline, its upper end being in the nearest proximity to the adjacent portion of said casing 10, while its lower end being farther removed therefrom.

Said frame 15 defines tunnel 16 leading into casing 10. A portion of said casing adjacent the outer end of said tunnel 16 is cut away to define opening 17. The inner end of said tunnel 16 receives trap door 18, which is supported at its upper end by hinge 19, which is affixed to the upper end of said trap door 18 and to the upper portion of frame 15 at the inclined face thereof. Said hinge 19 is affixed to the outer face of said door 18 for permitting swinging of said door inwardly of casing 10. The upright bars and the lower end of frame 15, adjacent the inclined inner face thereof, are provided with a continuous groove 20 for receiving the adjacent marginal portion of trap door 18. The upper end of said trap door 18 is positioned below the upper portion of frame 15. By virtue of this construction the inner face of trap door 18 remains flush with the said inclined face of frame 15. The marginal portions of frame 15, defined by groove 20, and which are in a transverse relation with trap door 18 form a stop for said trap door 18 preventing the swinging movement of the door towards opening 17, but permitting the swinging movement thereof in the opposite direction, that is towards the center of casing 10 as is indicated by dotted lines in Fig. 2.

From the hereinabove construction it will be seen that a rodent entering opening 17 and tunnel 16, by giving a push to trap door 18 will swing the latter into the casing, making thereby an opening thereinto for entering into the casing. Having once entered into the casing, trap door 18 will assume its normal position, shown by full lines in Fig. 2, preventing the egress of the rodent.

All the parts of the trap should be preferably made of metal, with door 18 made of a very light material, such as aluminum permitting ready swinging thereof inwardly of casing 10 at the push of the entering rodent.

Adjacent the lower end of casing 10, and above tray 11, a plurality of openings 21 may be made in said casing 10 for permitting a view for the rodent into the casing, while a rodent is on the outside, in order that the rodent may be attracted therethrough to the bait laid upon tray 11. A similar opening 22, for an identical purpose, is made at the lower edge of trap door 18 and centrally thereof. When a rodent attempts to enter casing 10 through said opening 22 it will merely facilitate to raise trap door 18 and rodent's entrance therebelow into casing 10. Otherwise said openings 21 and 22 are not sufficiently large so as to permit entrance or egress into or out of the trap.

While there is described herein a preferred embodiment of the present invention, it is nevertheless to be understood that minor changes may be made therein without departing from the spirit and scope of the invention as claimed.

What I claim as new is:

1. A rodent trap comprising a vertically disposed elongated cylindrical container having a bottom bait-supporting tray extending across one end thereof, said container having a rodent admitting aperture formed in the wall thereof adjacent said tray, a support member disposed within said container with its base resting on said tray, said support member having a curvilinear outer face complementing the curvature of and being secured to the inner periphery of said wall, said support member having an inner planar face inclined at an angle to said base whereby the area of said base is greater than the area of the top thereof, said member having a passageway formed therein extending from said inner to said outer faces and being aligned with said aperture, said support member having a groove extending inwardly from said inner face of said member below said passageway, a closure member pivotally mounted on said support member above said passageway, and said closure member having the lower edge thereof normally disposed within said groove, whereby a rodent seeking bait disposed on said tray will pass through said aperture and passageway and push against said closure member to pivot said closure member inwardly and upwardly to enter said container, thereafter said closure member pivots downwardly under the force of gravity until said edge enters said groove to trap said rodent within said container.

2. A rodent trap comprising a vertically disposed, elongated cylindrical container having a bottom bait-supporting tray extending across one end thereof, a closure member pivotally mounted on said container and extending across the other end thereof, means releasably securing said closure member in its closed position, said container having a rodent admitting aperture formed in the wall thereof adjacent said tray, a support member disposed within said container with its base resting on said tray, said support member having a curvilinear outer face complementing the curvature of and being secured to the inner periphery of said wall, said support member having an inner planar face inclined at an angle to said base whereby the area of said base is greater than the area of the top thereof, said support member having a passageway formed therein extending from said inner to said outer faces and being aligned with said aperture, said support member having a groove extending inwardly from said inner face below said passageway, a closure member pivotally mounted on said support member above said passageway, said last named closure member having the lower edge thereof normally disposed within said groove, said lower edge having an inwardly extending notch formed therein and extending above said groove when said closure member is in its closed position, and said wall having a plurality of diametrically disposed light admitting apertures formed therein adjacent said tray whereby a rodent after having sighted bait placed on said tray will pass through said aperture and said passageway and push against said last-named closure member to pivot said last named closure member inwardly and upwardly to enter said container, thereafter said last named closure member pivots downwardly under the force of gravity until said edge enters said groove to trap said rodent within said container.

JOSEPH GOLASZEWSKI.

REFERENCES CITED

The following references are of record in the file of this patent:

UNITED STATES PATENTS

| Number | Name | Date |
|---|---|---|
| 1,044,202 | Lindberg | Nov. 12, 1912 |
| 1,063,347 | Hall | June 3, 1913 |
| 1,138,132 | Marsh | May 4, 1915 |
| 1,276,770 | Jones | Aug. 27, 1918 |
| 1,578,061 | Abadie | Mar. 23, 1926 |
| 1,597,236 | Lee | Aug. 24, 1926 |
| 1,619,634 | Roat | Mar. 1, 1927 |